(12) United States Patent
Swinford et al.

(10) Patent No.: US 6,715,297 B1
(45) Date of Patent: Apr. 6, 2004

(54) METHODS AND APPARATUS FOR SUPPORTING HIGH TEMPERATURE DUCTING

(75) Inventors: Mark Douglas Swinford, Centerville, OH (US); Kevin Todd Bowers, Bellbrook, OH (US)

(73) Assignee: General Electric Company, Schenectady, NY (US)

( * ) Notice: Subject to any disclaimer, the term of this patent is extended or adjusted under 35 U.S.C. 154(b) by 43 days.

(21) Appl. No.: 10/251,557

(22) Filed: Sep. 20, 2002

(51) Int. Cl.[7] .............................. F02C 7/20; F16L 9/14; F16L 3/08
(52) U.S. Cl. ...................... 60/796; 138/106; 138/149; 248/65
(58) Field of Search .................. 60/796, 262; 138/106, 138/149; 248/49, 65

(56) References Cited

U.S. PATENT DOCUMENTS

| 96,545 | A | 11/1869 | Brady |
|---|---|---|---|
| 398,620 | A | 2/1889 | Jobes |
| 520,514 | A | 5/1894 | Bryant |
| 600,988 | A | 3/1898 | Hayes |
| 821,564 | A | 5/1906 | Wilks et al. |
| 1,455,971 | A | 5/1923 | Rickenbacker et al. |
| 1,504,363 | A | 8/1924 | Madigan |
| 1,589,781 | A | 6/1926 | Anderson |
| 2,109,344 | A | 2/1938 | Selger |
| 3,130,747 | A | 4/1964 | Benaway |
| 3,418,810 | A | * 12/1968 | Cresswell et al. ............. 60/232 |
| 3,449,937 | A | 6/1969 | Dimmig |
| 3,674,014 | A | 7/1972 | Tillander |
| 3,838,083 | A | 9/1974 | Bell |
| 4,415,184 | A | * 11/1983 | Stephenson et al. .......... 285/47 |
| 5,109,888 | A | 5/1992 | Usui |
| 5,127,679 | A | 7/1992 | Pouplier |
| 5,188,398 | A | 2/1993 | Parimore, Jr. et al. |
| 5,263,312 | A | 11/1993 | Walker et al. |
| 5,321,205 | A | 6/1994 | Bawa et al. |
| 5,340,163 | A | 8/1994 | Merrer et al. |
| 5,369,952 | A | * 12/1994 | Walters ....................... 60/796 |
| 5,396,918 | A | 3/1995 | Parker |
| 5,431,507 | A | 7/1995 | Smilanick |
| 6,523,352 | B1 | * 2/2003 | Takahashi et al. ............ 60/796 |

FOREIGN PATENT DOCUMENTS

| DE | 1122469 | 4/1960 |
|---|---|---|
| GB | 2114694 A | 8/1983 |
| NL | 90041 | 12/1958 |
| RU | 278322 | 11/1966 |
| WO | WO 92/15816 | 9/1992 |

* cited by examiner

Primary Examiner—Charles G. Freay
(74) Attorney, Agent, or Firm—Nathan D. Herkamp; Armstrong Teasdale LLP; Robert B. Reeser, III

(57) ABSTRACT

A method enables a duct to be coupled to a gas turbine engine casing. The method comprises extending a first inner tube support member circumferentially around the duct, such that a radially inner side of the first inner tube support is against the duct, and wherein the first inner tube support member has a substantially curved cross sectional profile extending between the radially inner side of the first inner tube support, and a radially outer side of the first inner tube support. The method also comprises extending an outer tube support member circumferentially around the first inner tube support member such that the outer tube support member is against the first inner tube support member outer surface, and coupling the outer tube support member to the gas turbine engine casing.

19 Claims, 4 Drawing Sheets

METHODS AND APPARATUS FOR SUPPORTING HIGH TEMPERATURE DUCTING

BACKGROUND OF THE INVENTION

This invention relates generally to gas turbine engines, and more specifically to ducts which carry high temperature fluids within gas turbine engines.

At least some known gas turbine engines include a core engine having, in serial flow arrangement, a fan assembly and a high pressure compressor which compress airflow entering the engine, a combustor ignites a fuel-air mixture which is then channeled through a turbine nozzle assembly towards low and high pressure turbines which each include a plurality of rotor blades that extract rotational energy from airflow exiting the combustor. Furthermore, at least some known gas turbine engines include ducting that routes high temperature fluids from one area of the engine for use in another area of the engine. For example, ducting may carry high temperature bleed air having a temperature of at least 1000° F. for use in an engine anti-icing system.

As the high temperature fluids flow through the ducting, an external surface of the ducting may rise in temperature through heat transfer. However, such ducting may be routed through areas of the engine which are not as thermally resistant as the ducting. For example, in at least some known gas turbine engines, to facilitate minimizing the possibility of igniting flammable fluids, such as but not limited to hydraulic fluid, an external surface temperature limit of less than 400° F. is imposed on the external surfaces of the anti-icing ducting.

To facilitate reducing an external touch temperature of the ducting, at least some known ducting is wrapped with insulation. Furthermore, to maintain the structural rigidity and integrity of the ducting, the ducting is coupled to the engine with metallic bracket assemblies. To facilitate providing structural support to the ducting, without facilitating heat transfer through the support, at least some known bracket assemblies include inner tube supports that extend circumferentially around the duct.

Each inner tube supports has a substantially frusto-conical or wish-boned cross-sectional profile defined by a radially outer portion and a radially inner portion which are connected together at an apex that is substantially parallel the duct external surface. Insulation is then wrapped around the duct in the area between the inner tube supports, and a separate outer tube support is then welded or otherwise joined to the inner tube supports and the duct. Alternatively, the outer tube support is coupled to the supports and insulation material is injected into the cavity. To facilitate a reduction in the external surface touch temperature at locations along the tube and a distance from the supports, insulation is wrapped around the duct adjacent to each inner tube support, prior to a polyimide outer wrap, or a wrap fabricated from a similar composite based material, being extended around the insulation and a portion of the outer tube support. A mounting bracket is then coupled to the outer tube support. In another alternative embodiment, the outer tube support incorporates the mounting bracket, in the form of a casting.

However, during operation, stress concentrations may develop at the apex formed at the connection between the radially outer and radially inner portions of the inner tube supports. This stress is primarily caused by temperaturre induced axial and radial growth differences between the outer tube support and the pressure ducting. Over time, cyclic operation of the engine with such stress concentrations may lessen the useful life of the bracket assembly and/or the duct. Furthermore, because of the multiple components that must be assembled and aligned during assembly of such ducts, manufacturing such bracket assemblies and assembling such ducts may be time-consuming and costly process.

BRIEF SUMMARY OF THE INVENTION

In one aspect, a method for coupling a duct to a gas turbine engine casing is provided. The method comprises extending a first inner tube support member circumferentially around the duct, such that a radially inner side of the first inner tube support is against the duct, and wherein the first inner tube support member has a substantially curved cross sectional profile extending between the radially inner side of the first inner tube support, and a radially outer side of the first inner tube support. The method also comprises extending an outer tube support member circumferentially around the first inner tube support member such that the outer tube support member is against the first inner tube support member outer surface, and coupling the outer tube support member to the gas turbine engine casing.

In another aspect of the invention, a bracket assembly for a duct is provided. The bracket assembly includes a first inner tube support member that extends circumferentially around the duct, and an outer tube support member that extends circumferentially around the first inner tube support member. The first inner tube support includes a radially outer side, a radially inner side against the duct, and a body extending therebetween, wherein the body has a substantially smooth arcuate cross-sectional profile extending between the radially inner and outer sides.

In a further aspect of the invention, a duct for a gas turbine engine including a casing is provided. The duct includes a tube for transporting a fluid therein, and a bracket assembly for securing the tube to the engine casing. The bracket assembly is configured to reduce heat transfer from the tube to the engine casing. The bracket assembly includes a first inner tube support member and an outer tube support member. The first inner tube support member extends circumferentially around the tube such that a radially inner side of the first inner tube support member is against the tube. The outer tube support member extends circumferentially around the inner tube support member, such that a radially outer side of the first support member is against the outer tube support member. The first inner tube support member has a substantially semi-elliptical cross-sectional profile extending between the first inner tube support radially inner and outer sides.

DETAILED DESCRIPTION OF THE INVENTION

Figure 1:
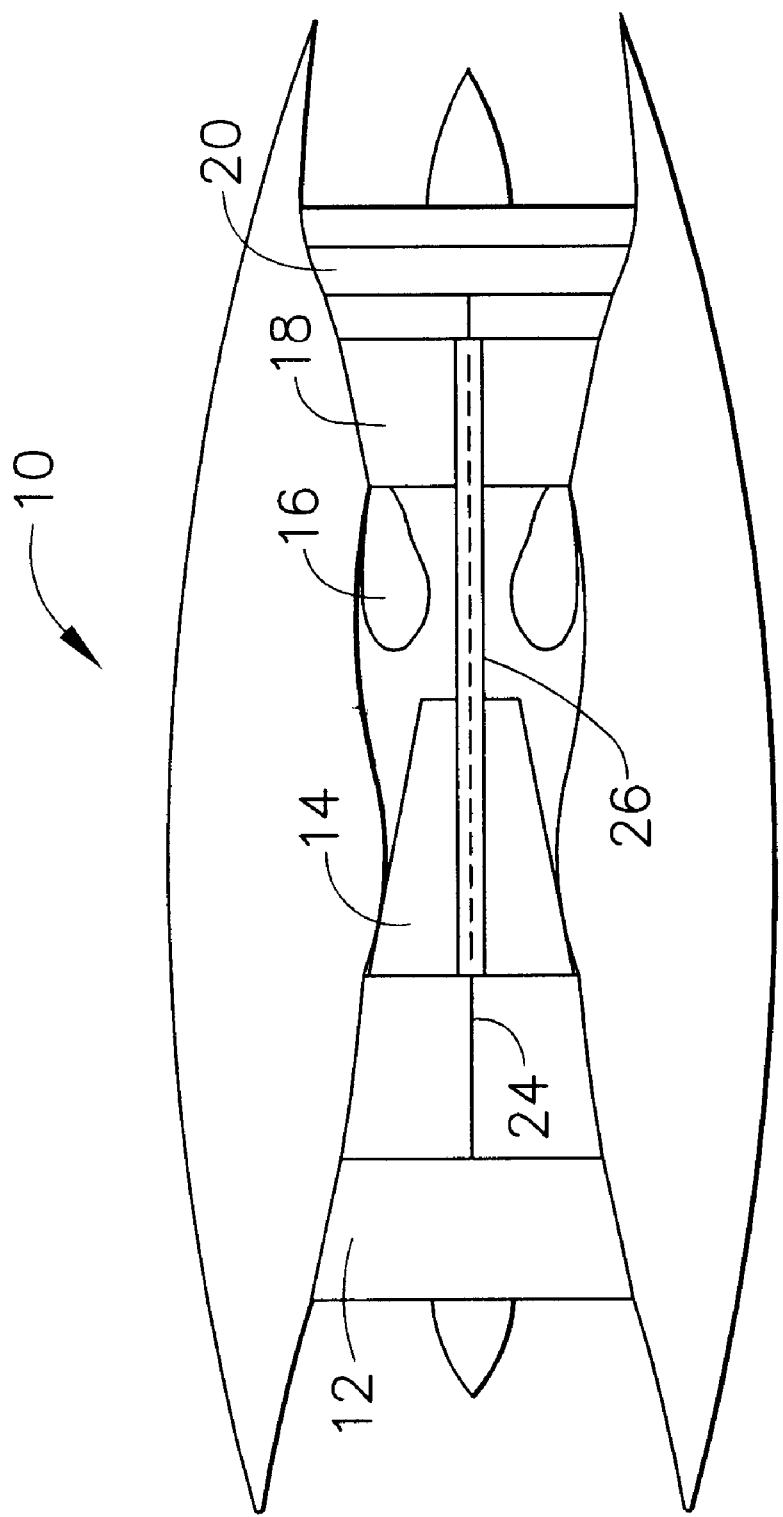
FIG. 1 is schematic illustration of a gas turbine engine.

FIG. 1 is a schematic illustration of a gas turbine engine 10 including a low pressure compressor 12, a high pressure compressor 14, and a combustor 16. Engine 10 also includes a high pressure turbine 18 and a low pressure turbine 20. Compressor 12 and turbine 20 are coupled by a first shaft 24, and compressor 14 and turbine 18 are coupled by a second shaft 26. In one embodiment, the gas turbine engine is a GE90 available from General Electric Company, Cincinnati, Ohio.

In operation, air flows through low pressure compressor 12 and compressed air is supplied from low pressure compressor 12 to high pressure compressor 14. The highly compressed air is delivered to combustor 16. Airflow from combustor 16 drives turbines 18 and 20 before exiting gas turbine engine 10.

Figure 2:
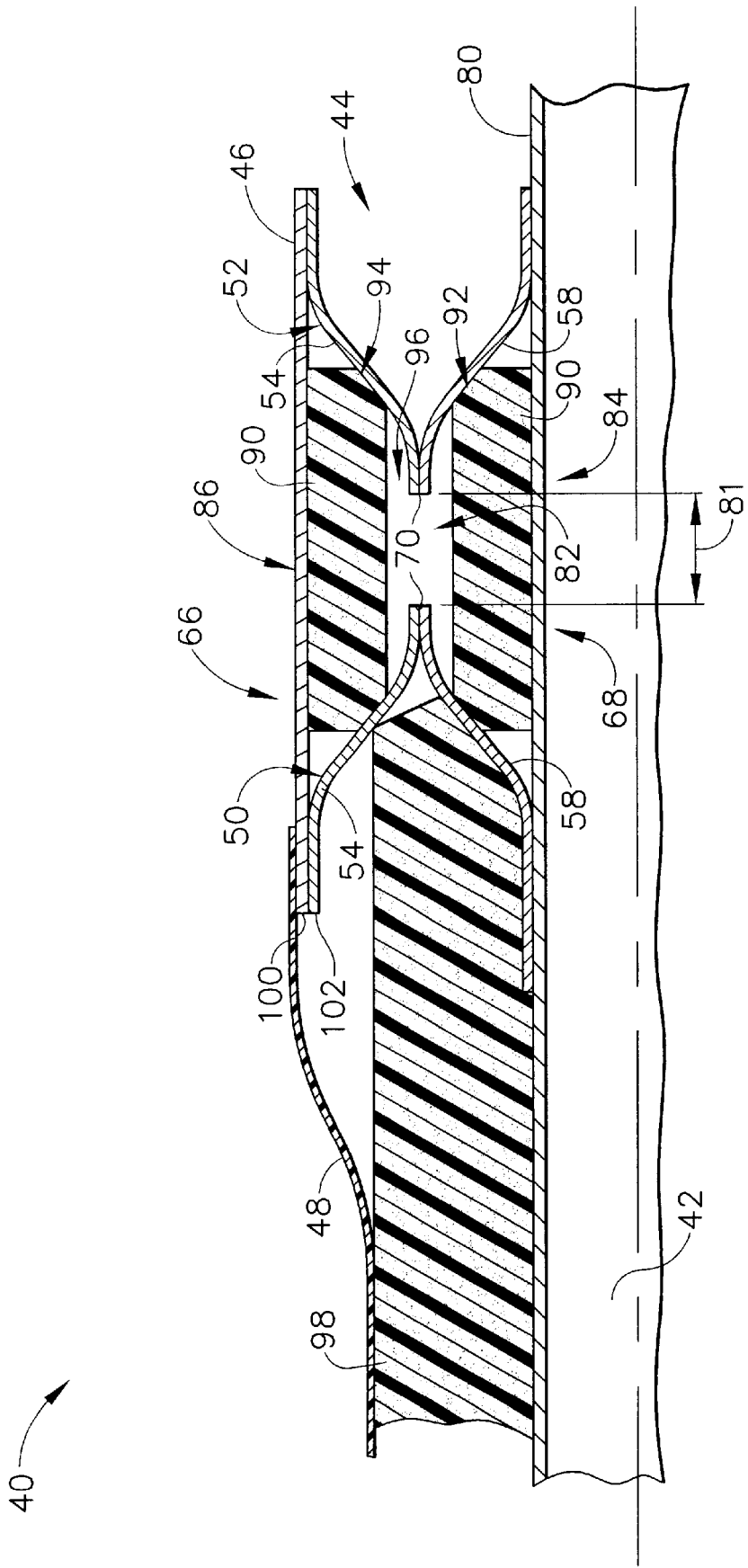
FIG. 2 is an enlarged partial cross-sectional view of a known bracket assembly that may be used to couple a duct to a gas turbine engine such as the gas turbine engine shown in FIG. 1.

FIG. 2 is an enlarged partial cross-sectional view of a known bracket assembly 40 that may be used to couple a duct 42 within a gas turbine engine, such as engine 10 (shown in FIG. 1). More specifically duct 42 is used to channel high temperature fluids from a first engine location for use at a second engine location. For example, in one embodiment, duct 42 is used to transport high temperature bleed air for use with an engine anti-icing system and channels air which has a temperature of at least 1000° F.

Bracket assembly 40 includes an inner tube support assembly 44, an outer tube support structure 46, and an external wrap 48. Inner tube support assembly 44 includes a pair of substantially identical inner tube supports 50 and 52, respectively, that each include a formed radially outer member 54 and a radially inner member 58. Each set of members 54 and 58 are coupled together midway between a radially outer side 66 of support assembly 44 and a radially inner side 68 of support assembly 44. More specifically, members 54 and 58 define a frusto-conical or wish-boned shaped cross-sectional profile for each tube support 50 and 52 when coupled. Accordingly, members 54 and 58 are joined at an apex 70 of the cross-sectional profile defined for each inner tube support 50 and 52.

Members 50 and 52 each extend circumferentially around duct 42 and are each positioned against an external surface 80 of duct 42. More specifically, members 50 and 52 are spaced apart a distance 81, such that a gap 82 is defined therebetween. Gap 82 is thus also bordered by a portion 84 of duct external surface 80 and by a portion 86 of outer tube support structure 46.

Outer tube support structure 46 extends circumferentially around duct 42 and around inner tube support assembly 44. More specifically, outer tube support structure 46 is coupled against inner tube support members 54. In the exemplary embodiment, duct 42, members 50 and 52, and outer tube support structure 46 are each fabricated from a metallic material such as, but not limited to, Inco® 625. A mounting bracket (not shown) is then coupled to outer tube support structure 46 for coupling duct 42 to gas turbine engine 10.

Insulation 90 is extended around duct 42 between inner tube support members 50 and 52 within gap 82. More specifically, insulation 90 is extended through gap 82 within a radially inner portion 92 of gap 82 and within a radially outer portion 94 of gap 82. Gap radially inner portion 92 extends from duct external surface 80 towards each inner tube support apex 70, and gap radially outer portion 94 extends from outer tube support structure 46 towards each inner tube support apex 70. Accordingly, a portion 96 of gap 82 between each inner tube support apex 70 remains uninsulated.

Additional insulation 98 is extended around duct 42 adjacent members 50 and 52, but external to gap 82. Insulation 98 is covered by external wrap 48 which is extended circumferentially around duct 42 over insulation 98. Furthermore, wrap 48 is extended at least partially over outer tube support structure 46, such that an edge 100 of outer tube support structure 46 and an outer edge 102 of each inner tube support member 54 is covered by wrap 48. In the exemplary embodiment, wrap 48 is fabricated from a polymide material, and insulation 90 and 98 are each fabricated from the same material, such as, but not limited to Min-K® insulation.

Figure 3:
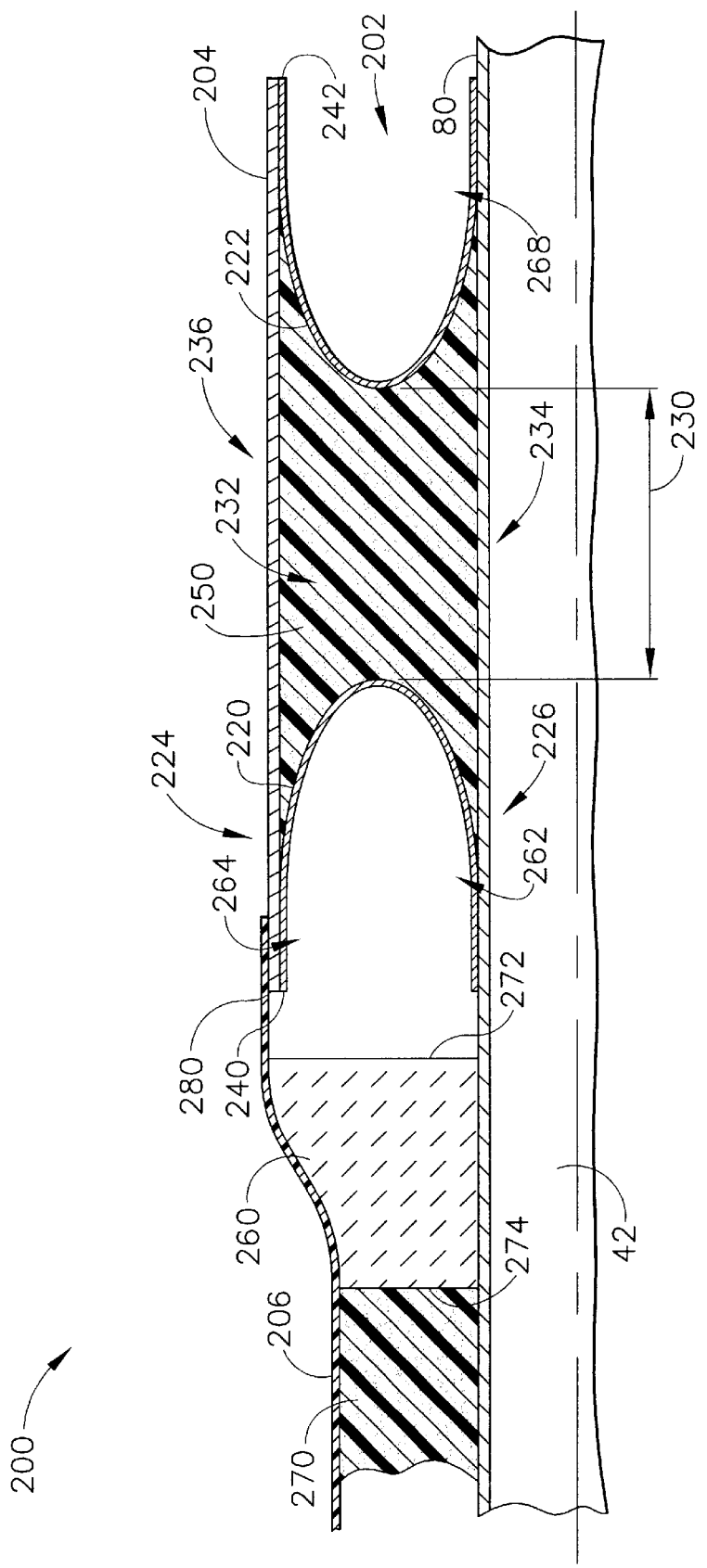
FIG. 3 is an enlarged partial cross-sectional view of a bracket assembly that may be used to couple a duct to a gas turbine engine, such as the gas turbine engine shown in FIG. 1.
Figure 4:
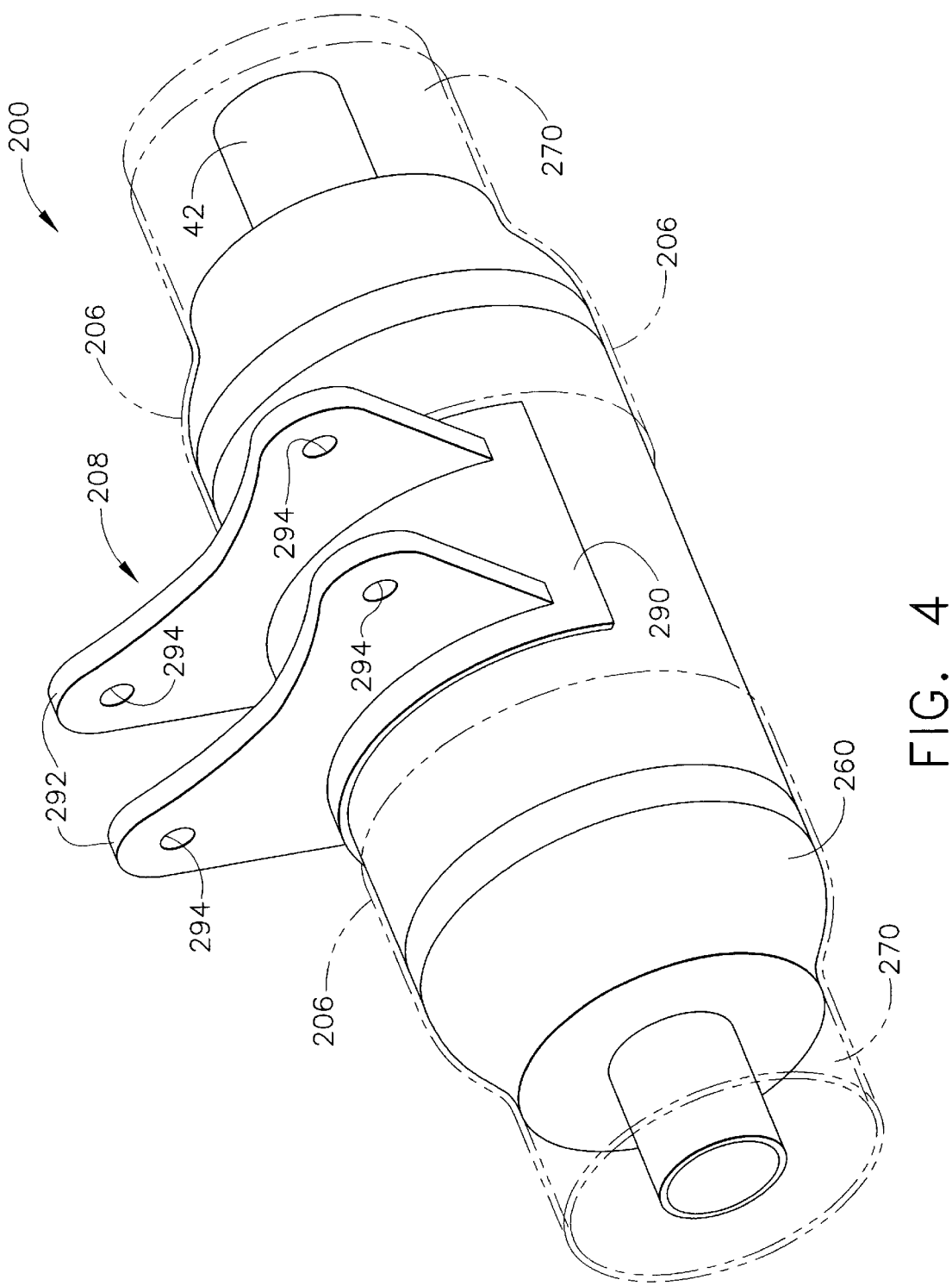
FIG. 4 is an enlarged perspective view of the bracket assembly shown in FIG. 3.

FIG. 3 is an enlarged partial cross-sectional view of a bracket assembly 200 that may be used to couple duct 42 to a gas turbine engine, such as gas turbine engine 10 (shown in FIG. 1). FIG. 4 is an enlarged perspective view of bracket assembly 200. Bracket assembly 200 includes an inner tube support assembly 202, an outer tube support structure 204, an outer wrap 206, and a mounting bracket 208.

Inner tube support assembly 202 includes a pair of substantially identical inner tube support members 220 and 222, respectively. In the exemplary embodiment, each tube support members 220 and 222 is a one piece assembly extending between a radially outer side 224 of inner tube support assembly 202 to a radially inner side 226 of inner tube support assembly 202. In an alternative embodiment, each tube support members 220 and 222 is fabricated from a plurality of formed pieces coupled together to form each support member 220 and 222. Support members 220 and 222 each have a substantially arcuate cross-sectional profile that extends smoothly between inner tube support assembly sides 224 and 226. More specifically, members 220 and 222 each have a substantially semi-elliptical cross-sectional profile. In an alternative embodiment, members 220 and 222 each have a non-substantially semi-elliptical cross-sectional profile. In a further alternative embodiment, members 220 and 220 include substantially planar portions and include only a partial elliptical cross-sectional profile that is positioned midway between duct 42 and outer tube support structure 204.

Accordingly, members 220 and 222 do not include any corners between inner tube support assembly sides 224 and 226.

Members 220 and 222 each extend circumferentially around duct 42 and are each positioned against duct external surface 80. More specifically, members 220 and 222 are spaced a distance 230, such that a gap 232 is defined between members 220 and 222. Gap 232 is thus also bordered by a portion 234 of duct external surface 80 and by a portion 236 of outer tube support structure 204.

Outer tube support structure 204 extends circumferentially around duct 42 and around inner tube support assembly 202 such that support structure 204 is substantially parallel duct external surface 80. More specifically, outer tube support structure 204 is coupled against inner tube support members 220 and 222 such that outer tube support structure 204 extends from a radially outer edge 240 of member 220 to a radially outer edge 242 of member 222. In the exemplary embodiment, duct 42, members 220 and 222, and outer tube support structure 204 are each fabricated from a metallic material such as, but not limited to, Inco® 625.

Insulation 250 is extended circumferentially around duct 42 between inner tube support members 220 and 222 within gap 232. More specifically, insulation 250 substantially fills gap 232 laterally between members 220 and 222, and radially between duct 42 and outer tube support structure 204.

A ceramic spacer 260 is extended circumferentially around duct 42 adjacent member 220 such that a gap 262 is defined between an upstream side 264 of member 220 and ceramic spacer 260. In another embodiment, ceramic spacer 260 is also extended circumferentially around duct 42 adjacent member 222 such that a gap (not shown) is defined between a downstream side 268 of member 222 and ceramic spacer 260. Additional insulation 270 is extended around duct 42 against each each side 272 and 274 of ceramic spacer 260, such that gap 262 is substantially filled by insulation 270. In the alternative embodiment described above, insulation 270 also substantially fills the gap defined between ceramic spacer 260 and member downstream side 268. In an alternative embodiment, insulation 250 is not used within gap 232, but rather an additional ceramic spacer substantially fills gap 232.

Insulation 270 and ceramic spacer 260 are each covered by external wrap 206 which is extended circumferentially around duct 42 over insulation 270 and ceramic spacer 260. Furthermore, wrap 206 is extended at least partially over outer tube support structure 204, such that an edge 280 of outer tube support structure 204 and inner tube support member radially outer edge 240 is covered by wrap 206. In the exemplary embodiment, wrap 206 is fabricated from a polymide material, and insulation 250 and 270 are each fabricated from the same material, such as, but not limited to Min-K® insulation.

Mounting bracket 208 is coupled to outer tube support structure 204 for coupling duct 42 to gas turbine engine 10. More specifically, mounting bracket 208 includes a base 290 that is contoured to substantially match a contour of outer tube support structure 204. Bracket 208 includes a pair of flanges 292 that extend substantially perpendicularly from base 290. Flanges 292 include a plurality of openings 294 sized to receive a fastener (not shown) therethrough for coupling mounting bracket 208 and duct 42 to gas turbine engine 10.

During operation, as high temperature fluids are channeled through duct 42, because bracket assembly inner tube members 220 and 222 are smoothly curved and do not include any corners, bracket assembly 200 facilitates reducing stress concentrations that may be induced in bracket assemblies 40 that include inner tube supports 50 and 52 which include corners 70. Furthermore, the smooth transition of each tube member 220 and 222 facilitates reducing stress concentrations, such that the structural rigidity and structural integrity of bracket assembly 200 are not compromised. Furthermore, because bracket assembly 200 includes additional insulation 250 and 270 in comparison to other known bracket assemblies 40, bracket assembly 200 facilitates reducing temperature transmission to engine 10 through mounting bracket 208. In addition, bracket assembly 200 also uses fewer components than bracket assembly 40, and as such, manufacturing and assembly costs are facilitated to be reduced.

The above-described bracket assembly is cost-effective and highly reliable. Each bracket assembly includes an inner tube support that includes a smooth transition between the outer tube support and the duct. Accordingly, the inner tube support facilitates reducing stress concentrations that may be induced to the bracket assembly. Furthermore, the bracket assembly includes additional insulation that facilitates reducing heat transfer through the mounting bracket. Accordingly, the above-described bracket assembly facilitates extending a useful life of the high temperature duct in a cost-effective and reliable manner.

Exemplary embodiments of bracket assemblies are described above in detail. The assemblies are not limited to the specific embodiments described herein, but rather, components of each assembly may be utilized independently and separately from other components described herein. Each bracket assembly component can also be used in combination with other bracket assembly components.

While the invention has been described in terms of various specific embodiments, those skilled in the art will recognize that the invention can be practiced with modification within the spirit and scope of the claims.

What is claimed is:

1. A method for coupling a duct to a gas turbine engine casing, said method comprising:

extending a first inner tube support member circumferentially around the duct, such that a radially inner side of the first inner tube support is against the duct, and wherein the first inner tube support member has a substantially curved cross sectional profile extending between the radially inner side of the first inner tube support, and a radially outer side of the first inner tube support;

extending an outer tube support member circumferentially around the first inner tube support member such that the outer tube support member is against the first inner tube support member outer surface; and coupling the outer tube support member to the gas turbine engine casing.

2. A method in accordance with claim 1 further comprising extending a second inner tube support member circumferentially around the duct, wherein the first inner tube support member is a mirror image of the second inner tube support, and such that a gap is defined between the first and second inner tube support members.

3. A method in accordance with claim 2 further comprising extending at least one of insulation and a ceramic spacer around the duct such that at least one of the insulation and the ceramic spacer substantially fill the gap between the first and second inner tube support members.

4. A method in accordance with claim 2 further comprising:

extending insulation around the duct against the first inner tube support member inner and outer sides;

extending a ceramic spacer around the tube such that the ceramic spacer is against insulation that is between the first inner tube support member and the ceramic spacer;

extending a wrap around the ceramic spacer and at least a portion of the outer tube support member.

5. A method in accordance with claim 2 further comprising coupling a mounting bracket to the outer tube support member.

6. A bracket assembly for a duct, said bracket assembly comprising:

a first inner tube support member extending circumferentially around the duct, said first inner tube support comprising a radially outer side, a radially inner side against the duct, and a body extending therebetween, said body having a substantially smooth arcuate cross-sectional profile extending between said radially inner and outer sides; and an outer tube support member extending circumferentially around said first inner tube support member.

7. A bracket assembly in accordance with claim 6 wherein said body has a substantially semi-elliptical cross-sectional profile extending between said radially inner and outer sides.

8. A bracket assembly in accordance with claim 6 further comprising a second inner tube support extending circumferentially around the duct, said first inner tube support substantially a mirror image of said second inner tube support, said first and said second inner tube supports spaced apart to define a gap therebetween.

9. A bracket assembly in accordance with claim 8 wherein at least one of insulation and a ceramic spacer substantially fills said gap.

10. A bracket assembly in accordance with claim 6 wherein insulation extends radially outwardly from the duct, said first inner tube support comprising an inner surface and an outer surface, each said inner and outer surface extending radially between said member radially inner and outer sides, said insulation against said first tube support inner and outer surfaces.

11. A bracket assembly in accordance with claim 10 further comprising a ceramic spacer extending circumferentially around the duct, said ceramic spacer adjacent insulation contacting said first inner tube support radially inner surface.

12. A bracket assembly in accordance with claim 11 further comprising an outer wrap extending circumferentially around said ceramic spacer and at least a portion of said outer tube support member.

13. A bracket assembly in accordance with claim 6 further comprising a mounting bracket coupled to said outer tube support member for coupling the duct to a structure.

14. A duct for a gas turbine engine including a casing, said duct comprising:

a tube for transporting a fluid therein; and a bracket assembly for securing said tube to the engine casing, said bracket assembly configured to reduce heat transfer from said tube to the engine casing, said bracket assembly comprising a first inner tube support member and an outer tube support member, said first inner tube support member extending circumferentially around said tube such that a radially inner side of said first inner tube support member is against said tube, an outer tube support member extending circumferentially around said inner tube support member, such that a radially outer side of said first support member is against said outer tube support member, said first inner tube support member having a substantially semi-elliptical cross-sectional profile extending between said first inner tube support radially inner and outer sides.

15. A duct in accordance with claim 14 wherein said bracket assembly further comprises a second inner tube support extending circumferentially around said tube, said first inner tube support substantially a mirror image of said second inner tube support, said first and said second inner tube supports spaced apart to define a gap therebetween.

16. A duct in accordance with claim 15 wherein said bracket assembly further comprises at least one of a ceramic spacer and insulation extending circumferentially around said tube and substantially filling said gap defined between said first and second inner tube support members.

17. A duct in accordance with claim 15 wherein bracket assembly further comprises insulation extending circumferentially around said tube, said bracket assembly first inner tube support between said insulation such that said first inner tube support inner and outer surfaces are positioned against said insulation.

18. A duct in accordance with claim 15 wherein said bracket assembly further comprises a ceramic spacer and insulation extending circumferentially around said tube, said insulation extending between said ceramic spacer and said first inner tube support member.

19. A duct in accordance with claim 15 wherein said bracket assembly first inner tube support member configured to facilitate reducing stress concentrations induced to said tube from said bracket assembly.

\* \* \* \* \*